(12) United States Patent
Lim et al.

(10) Patent No.: US 8,662,875 B2
(45) Date of Patent: Mar. 4, 2014

(54) INJECTION MOLDING APPARATUS FOR SHOE OR SOLE USING THERMOPLASTIC RESIN AND THEREBY SHOES

(75) Inventors: Byoung Mun Lim, Busan (KR); Jang Sik Yang, Gimhae-si (KR); Si Hyeok Lee, Gimhae-si (KR); In Chul Choi, Busan (KR)

(73) Assignees: Comtech Chemical Co., Ltd., Gimhae-Si, Gyeongsangnam-Do (KR); Sung Shin New Material Co., Ltd., Busan (KR)

( * ) Notice: Subject to any disclaimer, the term of this patent is extended or adjusted under 35 U.S.C. 154(b) by 584 days.

(21) Appl. No.: 12/816,057

(22) Filed: Jun. 15, 2010

(65) Prior Publication Data
US 2010/0242312 A1 Sep. 30, 2010

Related U.S. Application Data

(63) Continuation-in-part of application No. PCT/KR2008/001742, filed on Mar. 28, 2008.

(30) Foreign Application Priority Data

Dec. 27, 2007 (KR) .................. 10-2007-0138262

(51) Int. Cl.
*B29C 45/14* (2006.01)
*B29C 45/16* (2006.01)
*B29C 45/32* (2006.01)
*B29C 44/04* (2006.01)

(52) U.S. Cl.
USPC ......... 425/129.2; 425/4 R; 425/111; 425/119; 425/189; 425/192 R; 425/520; 425/572; 425/573; 425/577; 425/817 R; 249/119; 249/160; 249/161

(58) Field of Classification Search
CPC .. B29D 35/081; B29D 35/082; B29D 35/084; B29D 35/085; B29D 35/087; B29D 35/088; B29D 35/0027; B29D 35/0036

USPC ......... 425/4 R, 111, 112, 116, 117, 119, 120, 425/123, 125, 129.2, 130, 188, 192 R, 542, 425/544, 577, 589, 817 R, 128, 129.1, 190, 425/520, 572, 588; 249/119, 160, 204, 161, 249/162

See application file for complete search history.

(56) References Cited

U.S. PATENT DOCUMENTS 1,994,278 A * 3/1935 Prior et al. .................. 425/119
2,907,068 A * 10/1959 Vdolck ......................... 425/119

(Continued)

FOREIGN PATENT DOCUMENTS

| JP | 01-214303 | 8/1989 |
| JP | 02-029201 | 1/1990 |
| KR | 10-2001-004665 | 6/2001 |

OTHER PUBLICATIONS

International Search Report mailed Mar. 28, 2008 for PCT/KR2008/001742.

*Primary Examiner* — Seyed Masoud Malekzadeh
(74) *Attorney, Agent, or Firm* — Lowe Hauptman & Ham, LLP

(57) ABSTRACT

Disclosed herein are an injection foam molding apparatus for manufacturing one-piece shoes or soles and one-piece shoes manufactured using the same. A thermoplastic resin is injected into top and bottom molds in a state in which the top and bottom molds are coupled with a middle mold and is then pressed to form the upper and lower parts of a shoe, the middle mold is separated therefrom, and then the top mold and bottom mold, including the upper part and lower part of the shoe, respectively, are pressed, thereby forming the upper part and lower part of the shoe into one body. The injection foam molding apparatus is advantageous in that, since functional one-piece shoes or soles, having various colors, hardnesses and specific gravities, and having excellent feeling and durability, can be manufactured using different materials by one apparatus, working time is decreased, and productivity can be increased.

11 Claims, 11 Drawing Sheets

(56) References Cited

U.S. PATENT DOCUMENTS

| | | | |
|---|---|---|---|
| 3,608,004 A * | 9/1971 | Borisuck et al. | 264/244 |
| 3,682,579 A * | 8/1972 | Hujik | 425/129.2 |
| 3,751,200 A * | 8/1973 | Borisuck et al. | 425/119 |
| 3,813,201 A * | 5/1974 | Frederick et al. | 425/562 |
| 3,843,291 A * | 10/1974 | Drab | 425/215 |
| 3,852,005 A * | 12/1974 | Sculati et al. | 425/119 |
| 3,949,040 A * | 4/1976 | Drab | 264/161 |
| 4,032,611 A * | 6/1977 | Fukuoka | 264/244 |
| 4,123,493 A * | 10/1978 | Schilke et al. | 264/244 |
| 4,151,247 A * | 4/1979 | Hafele | 264/328.16 |
| 4,345,965 A * | 8/1982 | Lindenmayer et al. | 156/500 |
| 4,372,525 A * | 2/1983 | Uhlig | 249/102 |
| 4,407,034 A * | 10/1983 | Ralphs | 12/142 RS |
| 4,722,677 A * | 2/1988 | Rebers | 425/119 |
| 4,751,029 A * | 6/1988 | Swanson | 264/40.4 |
| 4,778,368 A * | 10/1988 | Rebers et al. | 425/119 |
| 4,981,430 A * | 1/1991 | Zimmerman, Jr. | 425/444 |
| 5,259,105 A * | 11/1993 | Zimmerman, Jr. | 29/436 |
| 5,348,458 A * | 9/1994 | Pontiff | 425/4 R |
| 5,667,738 A * | 9/1997 | Krajcir | 264/45.5 |
| 6,007,748 A * | 12/1999 | Krajcir | 264/46.4 |
| 6,168,741 B1 * | 1/2001 | Foldes | 264/244 |
| 6,299,817 B1 * | 10/2001 | Parkinson | 264/402 |
| 7,731,883 B2 * | 6/2010 | Johnson et al. | 264/259 |
| 8,361,369 B1 * | 1/2013 | Cook et al. | 264/244 |
| 2003/0227105 A1 * | 12/2003 | Paratore et al. | 264/161 |
| 2007/0193068 A1 * | 8/2007 | Calvano et al. | 36/87 |
| 2008/0073806 A1 * | 3/2008 | Wang | 264/45.1 |
| 2008/0083485 A1 * | 4/2008 | Chi | 156/245 |
| 2008/0175942 A1 * | 7/2008 | Chi-Jin | 425/4 |
| 2010/0098797 A1 * | 4/2010 | Davis et al. | 425/129.2 |

* cited by examiner

[FIG. 1]
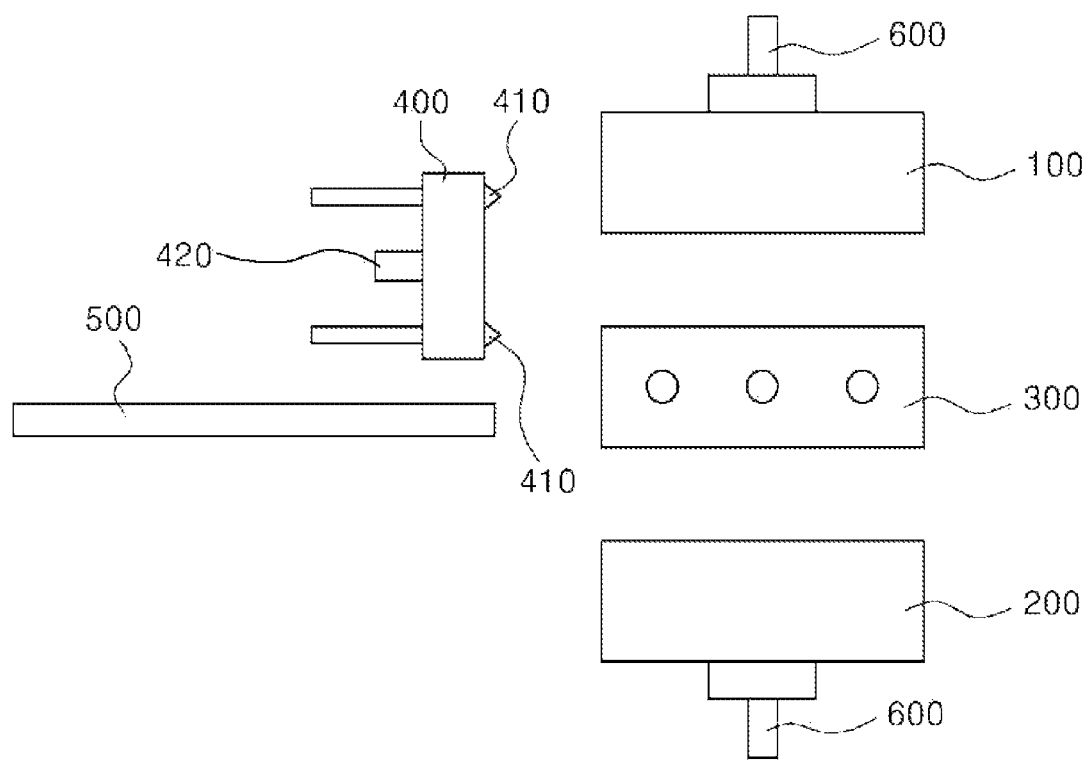

[FIG. 2]
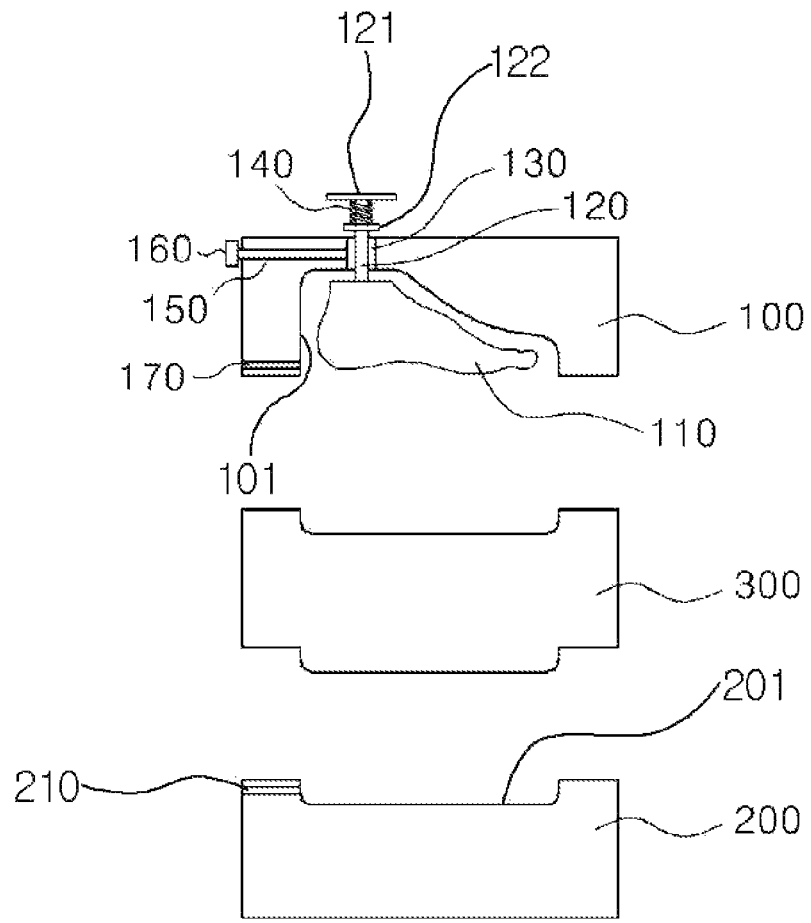
[FIG. 3]
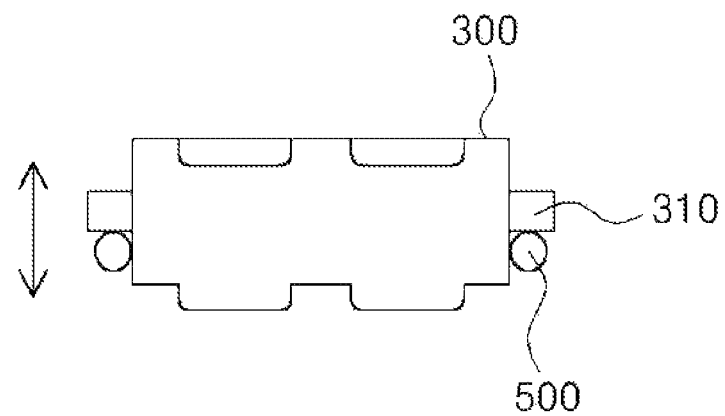

[FIG. 4]
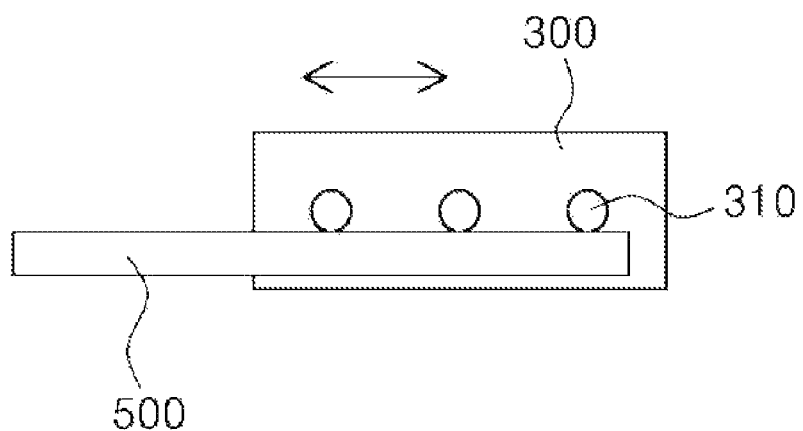
[FIG. 5]
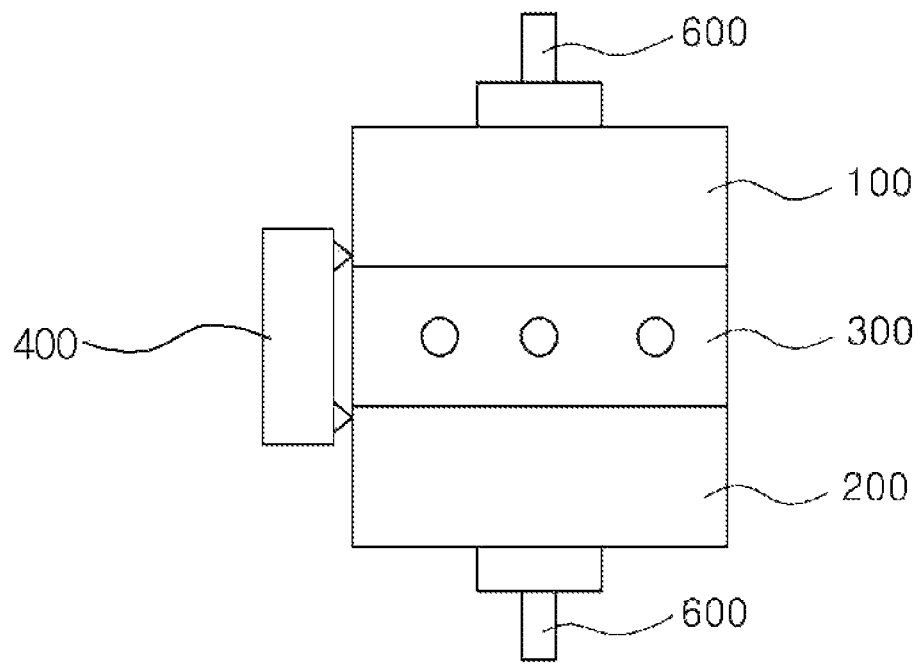

[FIG. 6]
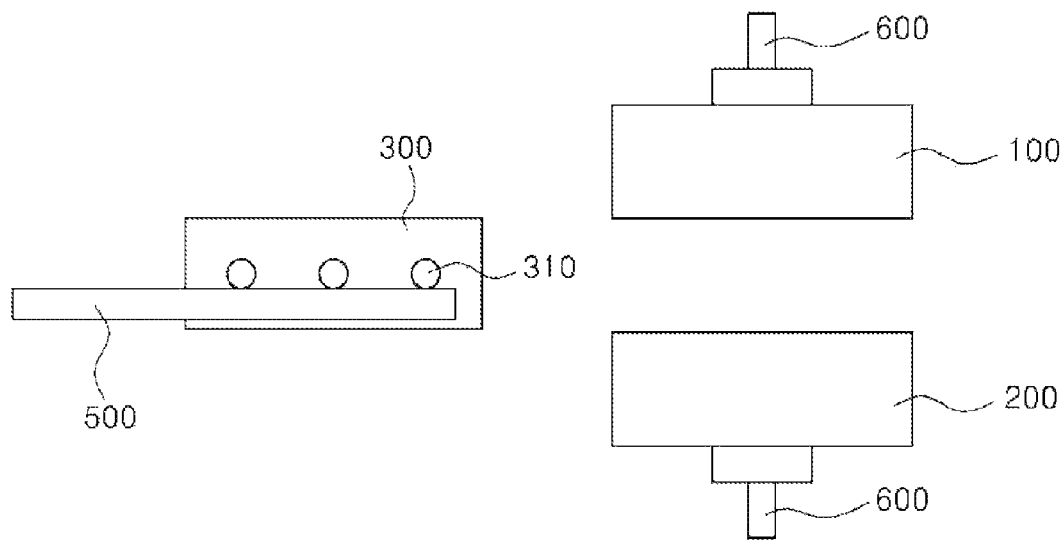
[FIG. 7]
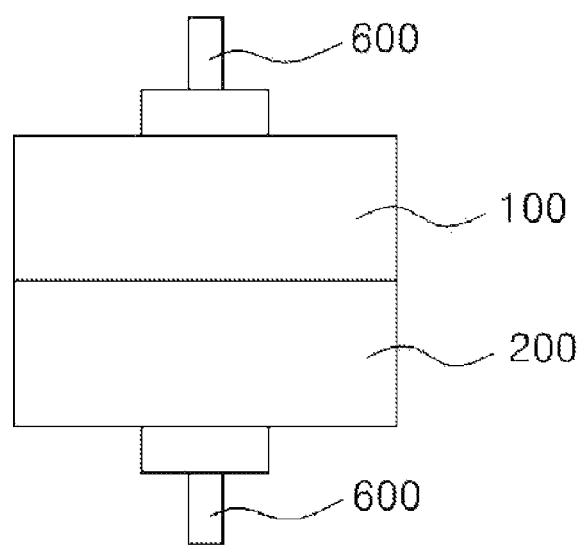

[FIG. 8]
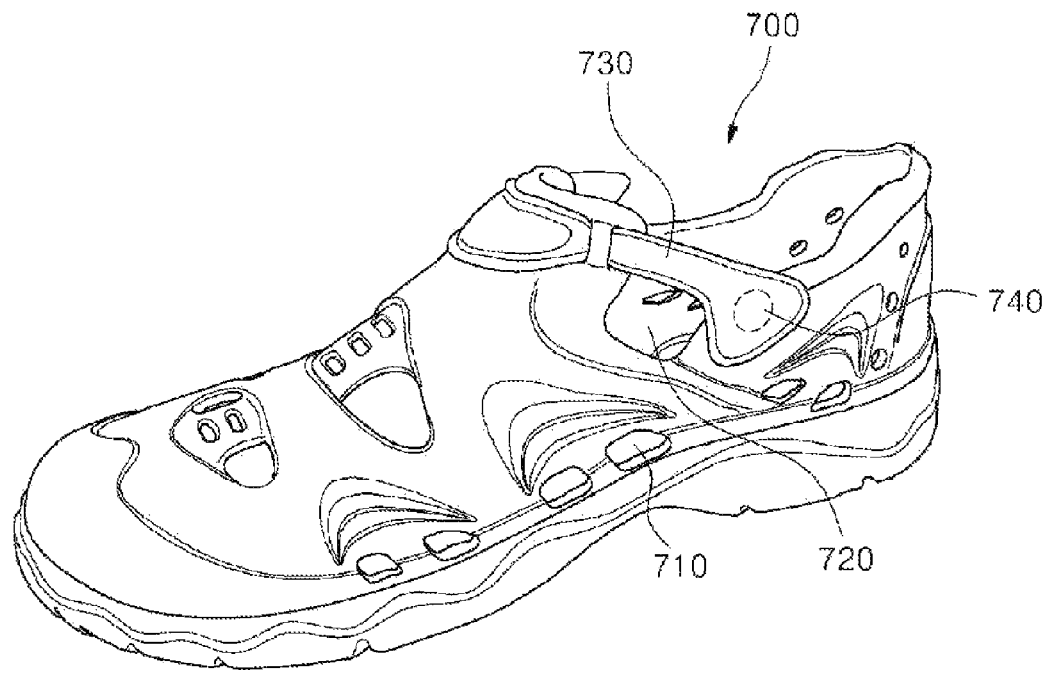
[FIG. 9]
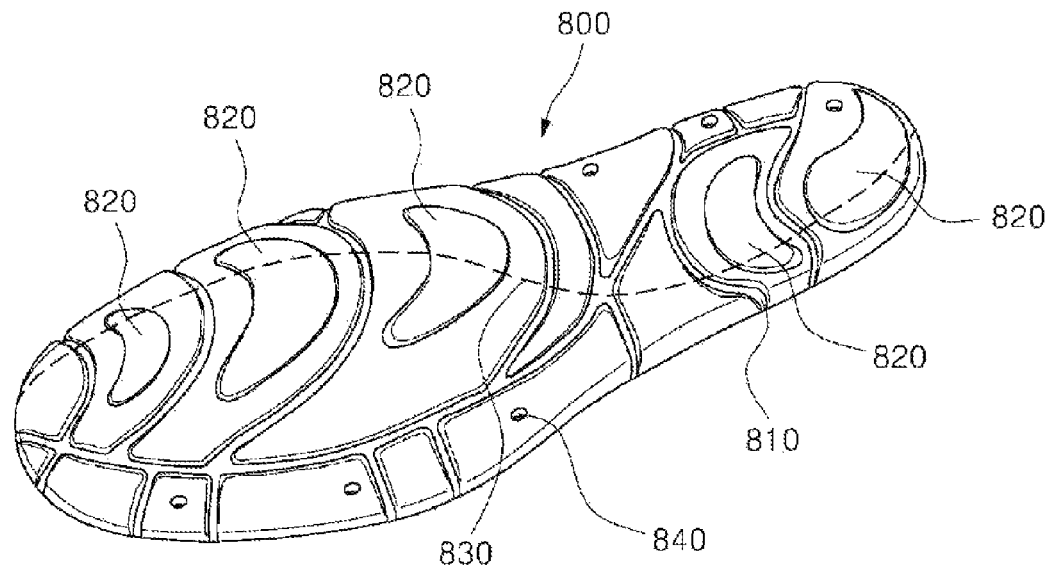

[FIG. 10]
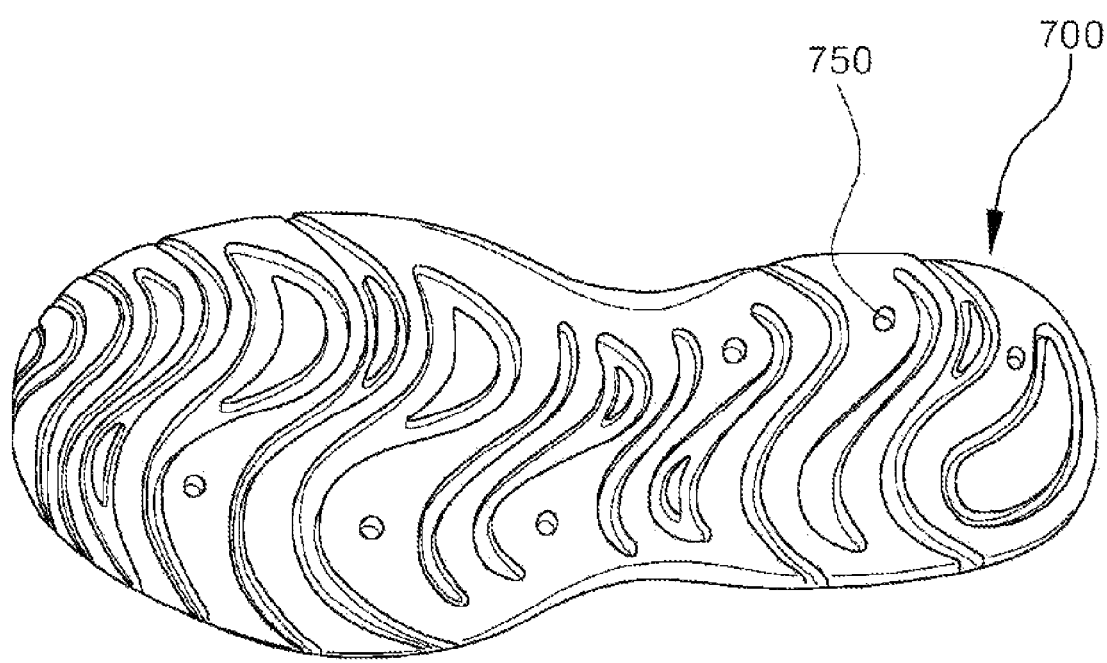
[FIG. 11]
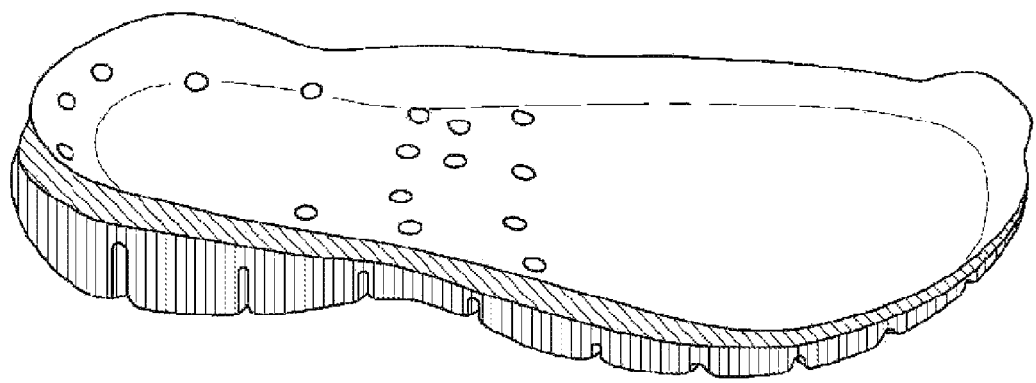

[FIG. 12]
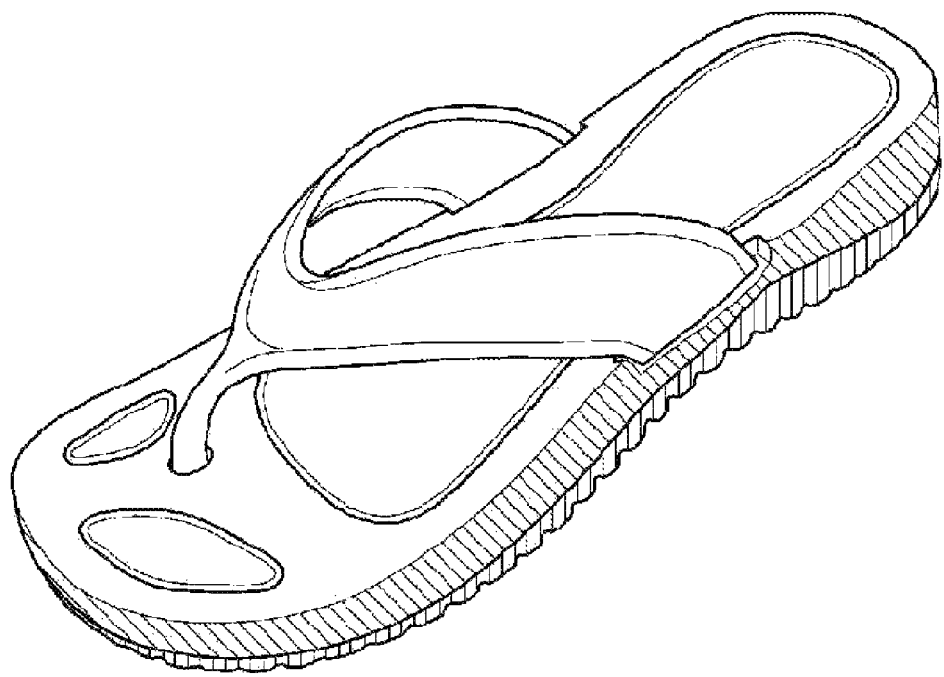

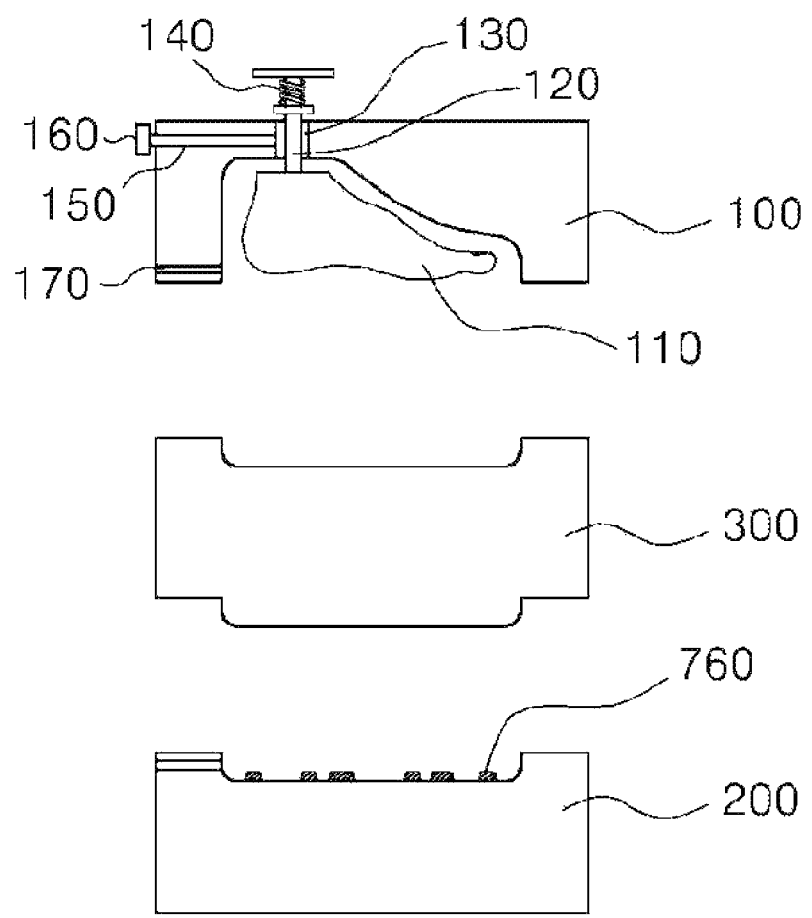
[FIG. 13]

[FIG. 14]
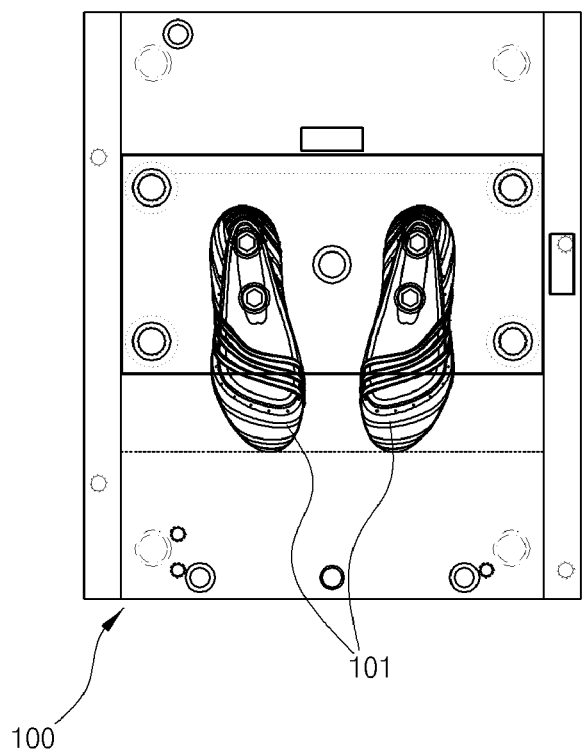

[FIG. 15]
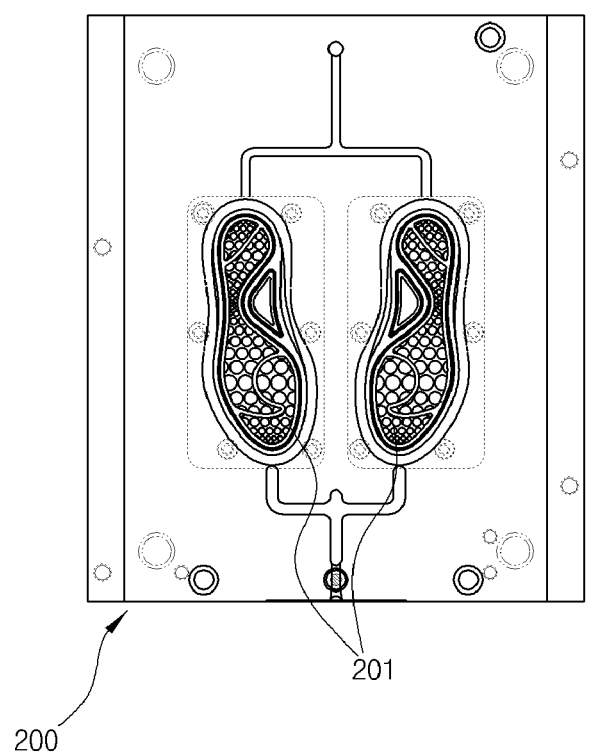

[FIG. 16]
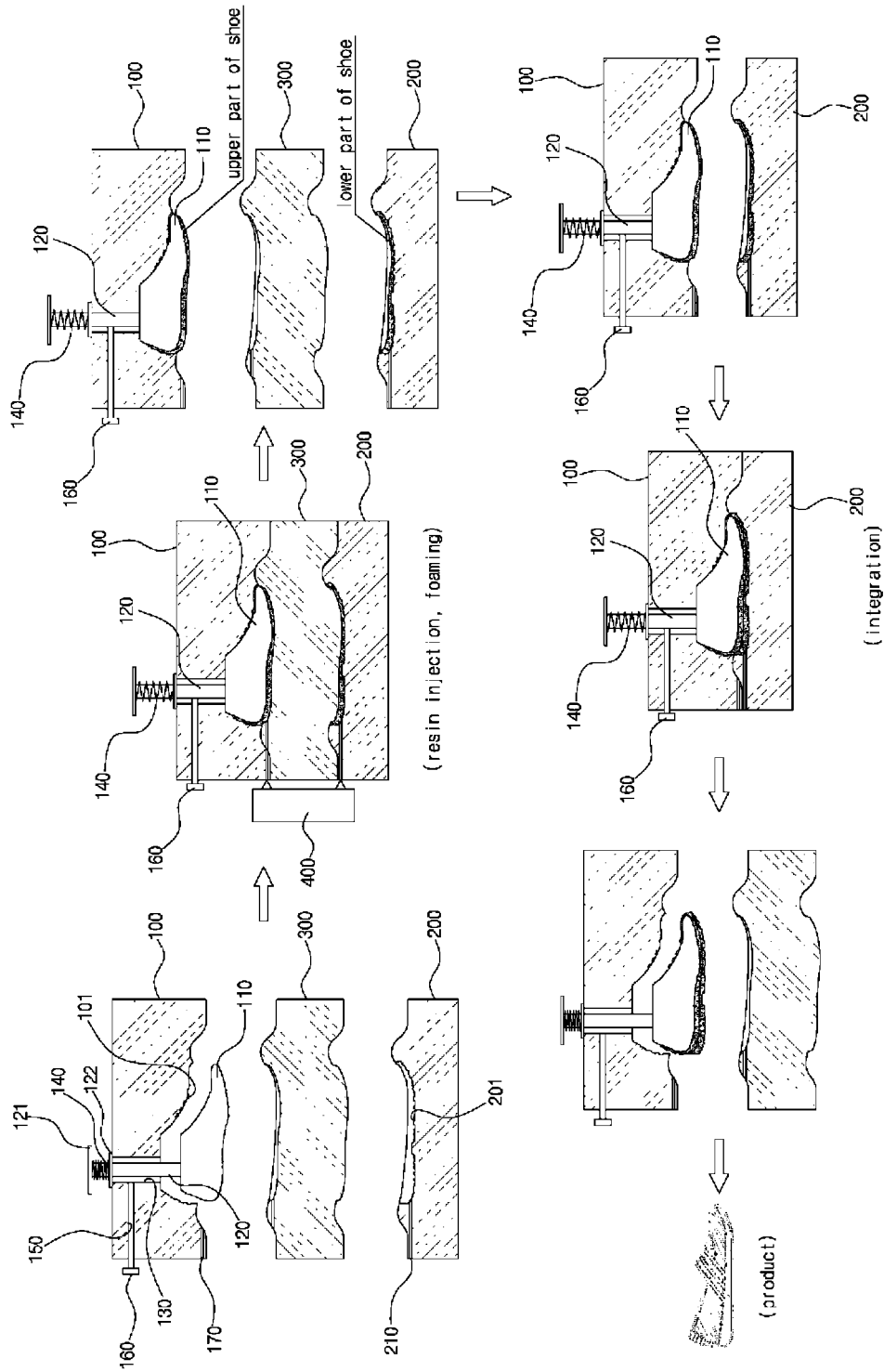

INJECTION MOLDING APPARATUS FOR SHOE OR SOLE USING THERMOPLASTIC RESIN AND THEREBY SHOES

CROSS REFERENCE TO RELATED APPLICATION

This application is a Continuation-in-Part Application of International Application No. PCT/KR2008/001742, filed Mar. 28, 2008, which claims the priority of Korean Patent Application No. 10-2007-0138262, filed on Dec. 27, 2007 in the KIPO (Korean Intellectual Property Office), the disclosures of which are incorporated by reference herein in their entirety.

TECHNICAL FIELD

The present invention relates to an injection foam molding apparatus for manufacturing one-piece shoes or soles using ethylene-vinyl acetate, ethylene-polyolefin compounds and thermoplastic resins, and one-piece shoes manufactured using the same. More particularly, the present invention relates to an injection foam molding apparatus for manufacturing one-piece shoes or soles having various colors, hardnesses and specific gravities, using thermoplastic resins, in which a thermoplastic resin is injected into a top mold and a bottom mold in a state in which the top mold and bottom mold are coupled with a middle mold and is then pressed to form the upper part and lower part of a shoe, the middle mold is separated therefrom, and then the top mold and bottom mold, including the upper part and lower part of the shoe, respectively, are pressed to each other, thereby forming the upper part and lower part of the shoe into one body, and to one-piece shoes manufactured using the same.

BACKGROUND ART

Generally, a shoe includes an upper covering the top side and lateral side of a foot, and soles constituting the bottom of the shoe. In this case, the soles include an insole contacting the bottom of a foot, an outsole contacting the ground, and a midsole located between the insole and outsole.

In order to manufacture such a shoe, since parts made of various materials are fabricated and are then assembled into a shoe, there is a problem in that processes are complicated and thus it takes a lot of time and incurs high costs to manufacture the shoe. Further, since adhesives must be used, there is a problem in that the working environment becomes bad, and processes become complicated.

Recently, methods of inexpensively manufacturing a shoe using the same materials have been developed. However, since such a shoe is difficult to manufacture in one piece, an upper and soles are separately fabricated, and are then attached to each other, and thus adhesives are inevitably used.

In order to solve the above problems, Korean Unexamined Patent Publication No. 10-2001-99480, entitled "Mold for shoes and sandals manufactured using the same", discloses a method of manufacturing one-piece shoes using a foot-shape moving core provided in a top mold.

This method is advantageous in that, since shoes are manufactured in one piece using the same materials, work can be conveniently performed, but is problematic in that the feeling or durability of the shoes manufactured using this method is problematic. That is, when shoes are manufactured using soft material, there is a problem in that the feeling is improved, but the portions contacting the ground are easily abraded, thus decreasing durability. In contrast, when shoes are manufactured using a material having high wear resistance, there is a problem in that durability is improved, but the feeling is deteriorated.

Further, the shoes manufactured in one piece are problematic in that, since they are manufactured using synthetic resin, which has poor air permeability, sweat and smell are generated when they are put on for a long time, thus deteriorating the feeling.

DISCLOSURE

Technical Problem

Accordingly, the present invention has been made keeping in mind the above problems occurring in the prior art, and an object of the present invention is to provide an injection foam molding apparatus for manufacturing functional one-piece shoes or soles having various colors, hardnesses and specific gravities, and having excellent feeling and durability, using ethylene-vinyl acetate, ethylene-polyolefin compounds and thermoplastic resins, by which work can be easily conducted, and productivity can be increased, and to provide one-piece shoes manufactured using the injection foam molding apparatus.

Technical Solution

In order to accomplish the above object, an aspect of the present invention provides an injection foam molding apparatus for manufacturing a one-piece shoe or sole having various colors, hardnesses and specific gravities, using ethylene-vinyl acetate (EVA), ethylene-polyolefin compounds and thermoplastic resins, comprising: a top mold including a molding space having a shape corresponding to an upper part of a shoe or sole; a bottom mold including a molding space having a shape corresponding to a lower part of a shoe or sole; a middle mold coupled between the top mold and the bottom mold and separating the two molding spaces from each other; a resin supply unit supplying different thermoplastic resins into the molding space defined between the top mold and the middle mold and the molding space defined between the middle mold and the bottom mold, respectively; a transfer unit moving the middle mold into a space between the top mold and the bottom mold and removing the middle mold from the space between the top mold and the bottom mold; and a pressing unit pressing the thermoplastic resins charged in the molding spaces by moving the top mold and bottom mold upward and downward, wherein the thermoplastic resins are injected into the top mold and bottom mold in a state in which the top mold and bottom mold are coupled with a middle mold, and then form the upper part and lower part of a shoe or sole in a state in which the top mold and the bottom mold are pressed by the middle mold, the middle mold is separated therefrom, and then the top mold and bottom mold, including the upper part and lower part of the shoe or sole, respectively, are pressed to each other, thereby forming the upper part and lower part of the shoe or sole into one body.

In the injection foam molding apparatus, the top mold includes a moving core forming the inner shape of a shoe.

In the injection foam molding apparatus, the moving core is provided in the top mold such that it can move upward and downward, and is forcibly biased downward by a spring.

In the injection foam molding apparatus, the top mold is provided at one side thereof with a holding unit for preventing the moving core from being displaced upward and downward.

In the injection foam molding apparatus, the thermoplastic resin is one or more selected from among olefin resins, ethylene-vinyl acetate (EVA), ethylene-octene copolymer, ethylene-butene copolymer, Engage, Tafmer, and compounds thereof.

Another aspect of the present invention is provides a one-piece shoe, manufactured using the injection foam molding apparatus, wherein the one-piece shoe has upper and lower parts made of different materials, and has various colors, hardnesses, and specific gravities.

In the one-piece shoe, a plurality of air holes is bored into the upper and bottom of the one-piece shoe, a plurality of air passages is concavely formed in the bottom side of an insole inserted into the one-piece shoe, and the ends of the air passage are adjacent to the air holes, thus allowing air to flow into/out of the one-piece shoe.

In the one-piece shoe, impact absorbing members are provided beneath an insole such that they protrude along an impact curve, along which an impact is applied to a foot of a walker at the time of walking, and recesses corresponding to the impact absorbing members are formed on the lower surface in the shoe, which contacts the lower surface of the insole.

In the one-piece shoe, concave recesses are formed in the lower surface of an outsole along an impact curve along which an impact is applied to the bottom of a foot of a walker at the time of walking, and impact absorbing members are provided in the concave recesses.

In the one-piece shoe, an opening is formed between the top and lateral side of a foot, a coupling member is provided at the end of the top of a foot and tightly secures a wearer's foot to prevent the shoe from coming off, and the coupling member is provided at the end thereof with fastening means, such as padding, a shoelace for fastening a shoe, Velcro tape, a snap button, or rubber.

As described above, the present invention provides an injection foam molding apparatus for manufacturing functional one-piece shoes or soles having various colors, hardnesses and specific gravities, and having excellent feeling and durability, using thermoplastic resins, by which work can be easily conducted, and productivity can be increased, and provides one-piece shoes manufactured using the injection foam molding apparatus.

For this, the injection foam molding apparatus of the present invention is configured such that a detachable middle mold is provided between a top mold and a bottom mold.

The reason why the detachable middle mold is provided between the top mold and bottom mold is that the upper part and lower part of a shoe are formed by injecting different thermoplastic resins into a top mold and a bottom mold in a state in which the top mold and bottom mold are coupled with a middle mold and then pressing the top mold and bottom mold against the middle mold, the middle mold is separated therefrom, and then the top mold and bottom mold are further pressed to attach the upper part and lower part of the shoe to each other, thus manufacturing one-piece shoes having improved feeling and durability and having various colors, hardnesses and specific gravities by using different materials, and that, since the injection of the thermoplastic resins and the attachment of the upper part and lower part of the shoe are simultaneously performed by one injection foam molding apparatus, work is easily conducted and productivity is improved.

Advantageous Effects

The one-piece shoe, manufactured using the injection molding foam apparatus of the present invention, is advantageous in that its upper part and lower part are made of different materials from each other, and its colors, hardnesses and specific gravities are various, thus improving product quality, feeling and durability.

Further, the present invention is advantageous in that, since the one-piece shoe is manufactured in the one injection foam molding apparatus, work is easily and conveniently conducted, and an assembly process is not required, so that processes are simplified, and pleasant work conditions are maintained owing to an environment-friendly method using a nature-friendly material.

DESCRIPTION OF DRAWINGS

FIG. 1 is a schematic view showing an injection foam molding apparatus for manufacturing a one-piece shoe, including a mold assembly, according to an embodiment of the present invention;

FIG. 2 is a sectional view of the mold assembly of FIG. 1;

FIG. 3 is a front view showing a middle mold and a transfer unit;

FIG. 4 is a side view showing a middle mold and a transfer unit;

FIG. 5 is a side view showing a mold assembly and a resin supply unit in a process of injecting a thermoplastic resin into the mold assembly;

FIG. 6 is a side view showing the mold assembly from which a middle mold is removed;

FIG. 7 is a side view showing the state in which the upper and lower parts of a shoe are coupled with each other;

FIG. 8 is a perspective view showing a one-piece shoe according to another embodiment of the present invention;

FIG. 9 is a perspective view showing the bottom side of an insole inserted in the one-piece shoe in FIG. 8;

FIG. 10 is a view showing the bottom of the one-piece shoe in FIG. 8;

FIG. 11 is a perspective view showing a sole according to a further embodiment of the present invention;

FIG. 12 is a perspective view showing a sandal according to a still further embodiment of the present invention;

FIG. 13 is a view showing a process of manufacturing a one-piece shoe through an insert method;

FIG. 14 is a bottom view illustrating a top mold having a space engraved in intaglio in the injection foam molding apparatus for manufacturing the one-piece shoe of FIG. 1;

FIG. 15 is a plan view illustrating a bottom mold having a space engraved in intaglio in the injection foam molding apparatus for manufacturing the one-piece shoe of FIG. 1; and FIG. 16 is a view sequentially illustrating the process of manufacturing a one-piece shoe using the injection foam molding apparatus for manufacturing the one-piece shoe according to the present invention.

DESCRIPTION OF THE ELEMENTS IN THE DRAWINGS

| | |
|---|---|
| 100: top mold | 110: moving core |
| 120: moving member | 130: through-hole |
| 140: spring | 150: holding hole |
| 160: bolt | 170: resin injection hole |
| 200: bottom mold | 300: middle mold |
| 310: protrusion | 400: resin supply unit |
| 410: nozzle | 500: transfer unit |
| 600: pressing unit | 700: one-piece shoe |

-continued

| | |
|---|---|
| 710: air hole | 720: opening |
| 730: coupling member | 740: Velcro tape |
| 750: air hole | 760: impact absorbing member |
| 800: insole | 810: air passage |
| 820: impact absorbing member | 830: impact curve |
| 840: through-hole | |

[Best Mode]

Hereinafter, preferred embodiments of the present invention will be described in detail with reference to the attached drawings.

FIG. 1 is a schematic view showing an injection foam molding apparatus for manufacturing a one-piece shoe having various colors, hardnesses and specific gravities according to an embodiment of the present invention, and FIG. 2 is a sectional view of a mold assembly used in the injection foam molding apparatus of FIG. 1.

Referring to FIG. 1, the injection foam molding apparatus for manufacturing a one-piece shoe having various colors, hardnesses and specific gravities according to an embodiment of the present invention may include a top mold 100, a bottom mold 200, a middle mold 300, a resin supply unit 400, a transfer unit 500, and pressing units 600.

The top mold 100 forms the upper part of the one-piece shoe, that is, the upper of the one-piece shoe and the upper part of the bottom of the shoe. As shown in FIGS. 2 and 14, the top mold 100 is engraved in intaglio to correspond to the outer shape of the upper of the shoe and the upper part of the bottom of the shoe. A space 101 formed through engraving is sealed by the middle mold 300, thus providing a molding space to the top mold 100. Further, a moving core 110 for forming the inner shape of the shoe is provided in the space 101 formed by engraving the top mold 100 in such a way as to move upward and downward. The moving core 110 is placed such that its outer surface is spaced apart from the inner surface of the space 101 formed by engraving the top mold 100, and a space defined between the space of the top mold 100 and the moving core 110 is filled with resin, so that a foam molding process is conducted (see FIG. 16).

A rod-shaped moving member 120 is integrally provided on the top of the moving core 110 to form the inner shape of the shoe. The moving member 120 is inserted into a through-hole 130 which is formed in the upper portion of the top mold 100. Thus, when the moving member 120 moves upward and downward along the through-hole 130 in the top mold 100, the moving core 110 may also move upward and downward along with the moving member 120. Further, an upper spring support end 121 is integrally provided on the upper end of the moving member 120, and a lower spring support end 122 having the shape of a ring is provided under the upper spring support end 121 and is fitted over the moving member 120 in such a way as to move upward and downward. Further, a spring 140 is mounted on the moving member 120 in such a way as to be positioned between the upper spring support end 121 and the lower spring support end 122. In such a structure, the lower spring support end 122 is stopped by the upper surface of the top mold 100. The lower spring support end 122 supported by the upper surface of the top mold 100, the spring 140, and the upper spring support end 121 support the moving core 110 through the moving member 120, with the lower and upper spring support ends 122 and 121 being provided on opposite sides of the spring 140. Further, the moving core 110 coupled integrally with the moving member 120 is biased downward by the force of the spring 140.

Further, the top mold 100 is provided at one side thereof with a holding unit for holding the moving core 110. In the holding unit according to an embodiment of the present invention, a holding hole 150 is formed from one side of the top mold 100 to the moving member 120, and a bolt 160 is inserted into the holding hole 150 in such a way as to move forward and backward through rotation. Thus, when a worker rotates the bolt 160 so that it moves forward and an end of the bolt presses the moving member 120, the moving core 110 is secured at a predetermined position. In contrast, when a worker rotates the bolt 160 so that it moves backward, the pressing of the moving core 110 is released, thus enabling the moving core 110 to move freely.

However, methods of holding the moving core 110 are not limited to the aforementioned method of holding the moving core 110 using the bolt 160. For example, a cylinder having a piston rod inserted therein is installed in the holding hole 150, and a hole is formed at a position of the moving member 120. In such a state, when the piston rod of the cylinder moves forward, a pin provided on the piston rod is inserted into the hole of the moving member, thus holding the moving core 110. As such, the moving core 110 may be automatically held or released by the force of the cylinder, or may be held by a clamp or the like.

Subsequently, the bottom mold 200 will be described. The bottom mold 200 functions to form the lower part of the one-piece shoe together with the middle mold, is located under the top mold 100, and is engraved in intaglio to have a shape corresponding to the shape of the lower side of a shoe, as shown in FIG. 15. A space 201 formed by engraving the bottom mold in intaglio provides a molding space to the bottom mold 200.

The top mold 100 and bottom mold 200 have at predetermined positions thereof resin injection holes 170 and 210, respectively such that resin can be injected into the top mold 100 and bottom mold 200 in a state in which they are coupled with each other.

Subsequently, the middle mold 300 will be described. The middle mold 300 is coupled between the top mold 100 and the bottom mold 200. The upper surface of the middle mold 300 has a shape corresponding to the lower surface of the top portion of a shoe, and the lower surface of the middle mold 300 has a shape corresponding to the upper surface of the bottom portion of a shoe. Therefore, the upper surface of the middle mold 300 having the above-mentioned shape seals the space 101 which is formed by engraving the top mold 100 in intaglio in a state in which the middle mold 300 is coupled with the top mold 100. Thereby, the resin is injected into the sealed molding space to form the upper part of the shoe, and an injection foam molding process is conducted. Further, the lower surface of the middle mold 300 having the above-mentioned shape forms a sealed molding space along with the space 201 formed by engraving the bottom mold 300 in intaglio, in a state in which the middle mold 300 is coupled with the bottom mold 200. Thereby, the resin is injected into the sealed molding space to form the lower part of the shoe, and an injection foam molding process is conducted. Consequently, in a state in which the top mold 100, the bottom mold 200, and the middle mold 300 are coupled with each other, the two molding spaces for forming the upper part and the lower part of the shoe are separated from each other by the middle mold 300. Different kinds of resin are injected into the two independent molding spaces, so that the injection foam molding process is conducted. Subsequently, an integrating process is performed, thus providing one-piece shoes having various colors, specific gravities and hardness.

Subsequently, a resin supply unit 400 will be described with reference to FIG. 1. The resin supply unit 400 includes two nozzles 410 in the upper and lower portions thereof. The resin supply unit 400 is located behind the mold assembly and is moved forward and backward by an actuator (not shown) which may comprise a pneumatic or hydraulic cylinder. Reference numeral 420 denotes a shaft which is coupled to the piston rod of the cylinder which moves forward and backward. Since the piston rod is integrally coupled to the shaft 420 of the resin supply unit 400, the resin supply unit 400 may shift forward and backward as the piston rod moves forward and backward in a main body of the cylinder. In order to inject the resin, the resin supply unit 400 moves forward toward the mold assembly. Here, the two nozzles are provided to be aligned with the resin injection holes 170 and 210 (see FIG. 2) which are formed in the top mold 100 and the bottom mold 200. Thus, when the resin supply unit 400 moves forward in a state in which the top mold 100, the bottom mold 200 and the middle mold 300 are coupled with each other, the two nozzles 410 are inserted into the resin injection holes 170 and 210 formed in the top mold 100 and the bottom mold 200, thus permitting the injection of the resin. The resin supply unit 400 injects different kinds of thermoplastic resins through the respective nozzles 410 into the molds, that is, the sealed molding space defined between the top mold 100 and the middle mold 300, and the sealed molding space between the bottom mold 200 and the middle mold 300. In the present invention, examples of the thermoplastic resins include olefin resins, ethylene-vinyl acetate (EVA), ethylene-octene copolymer, ethylene-butene copolymer, Engage, Tafmer, and the like. By performing an injection foam molding process with the thermoplastic resins, shoes having various colors, specific gravities and hardnesses are obtained. When the injection of the resins has been completed, the resin supply unit 400 is moved backward by the actuator, so that the respective nozzles 410 are completely separated from the resin injection holes 170 and 210 of the molds 100 and 200.

Subsequently, a transfer unit 500 will be described. The transfer unit 500 serves to insert the middle mold 300 into a space between the top mold 100 and bottom mold 200 or to move the middle mold 300 out of the space between the top mold 100 and bottom mold 200, thus separating the middle mold 300 therefrom. For this, in an embodiment of the present invention, as shown in FIG. 3, a plurality of protrusions 310 is formed on both sides of the middle mold 300, the transfer unit 500 lifts up the protrusions 310 while being in contact with the lower surfaces of the protrusions 310, and then, as shown in FIG. 4, the transfer unit 500 moves forward and backward. Here, since the protrusions 310 are integrated with the middle mold 300, the middle mold 300 is lifted up when the transfer unit 500 lifts up the protrusions 310. In this state, if the transfer unit 500 moves forward and backward, the middle mold 300 also moves forward and backward. Of course, the transfer unit 500 is provided to perform vertical movement as well as forward and backward movement by an actuator (not shown). When the middle mold 300 is inserted between the top mold 100 and the bottom mold 200, the transfer unit 500 lifts up the middle mold 300 through the protrusions 310 and then moves forward to insert the middle mold between the top mold 100 and the bottom mold 200 (action of moving the middle mold to a position at which the middle mold may be coupled to the top mold and the bottom mold which move upward and downward). In contrast, when a worker desires to separate the middle mold 300 from the space between the top mold 100 and the bottom mold 200, the top mold 100 and the bottom mold 200 move upward and downward to be separated from each other. In this state, the transfer unit 500 moves backward and downward while supporting the middle mold 300 through the protrusions 310, thus completely separating the middle mold 300 from the top mold 100 and the bottom mold 200. In particular, when the middle mold 300 is inserted between the top mold 100 and the bottom mold 200, the middle mold 300 moves downward, so that the protrusions 310 of the middle mold 300 are inserted into grooves for holding the middle mold 300 in the injection foam molding apparatus, thus preventing the mold assembly from being displaced during an injection foam molding process.

Alternatively, the middle mold 300 may be placed on a rail, and then may move along the rail, instead of lifting up the middle mold 300 and then moving it.

Subsequently, a pressing unit 600 will be described. The pressing unit 600 serves to apply pressure to the resin injected into the mold assembly by pushing the top mold 100 downward and simultaneously pushing the bottom mold upward. For this, in the present invention, hydraulic cylinders (not shown) are provided above the top mold 100 and below the bottom mold 200, respectively, thus vertically moving each of the top mold 100 and bottom mold 200. The pressing unit, which is denoted by reference numeral 600 in FIG. 5, includes a piston rod which is moved upward and downward in each of the hydraulic cylinders provided on the upper and lower portions of the drawing. As shown in FIG. 5, when the resin is injected into the mold assembly using the resin supply unit 400, the top mold 100 and the bottom mold 200 are coupled to the middle mold 300 located therebetween. At this time, the hydraulic cylinder located above the top mold 100 moves the top mold 100 downward, and the hydraulic cylinder below the bottom mold 200 moves the bottom mold 200 upward, so that the top mold 100 moving downward is coupled to the middle mold 300, and the bottom mold 200 moving upward is coupled to the middle mold 300. When the three molds are coupled to each other, the mold closing state enabling the resin to be injected into the molding spaces defined by the molds is obtained. Meanwhile, when the resin is injected into the molding spaces of the molds and thus the foam molding process is completed, the hydraulic cylinder located above the top mold 100 moves the top mold 100 upward, and the hydraulic cylinder located below the bottom mold 200 moves the bottom mold 200 downward, thus separating both the top mold 100 moved upward and the bottom mold 200 moved downward from the middle mold 300, therefore separating the middle mold 300 from the top and bottom molds when the resin supply unit 400 is separated from the mold assembly. In this state, the middle mold 300 is moved backward by the transfer unit 500 to be separated from the top and bottom molds. Thereby, the middle mold 300 is moved backward to be completely removed from the space between the top mold 100 and the bottom mold 200, and a subsequent process of coupling the top mold 100 and the bottom mold 200 with each other may be conducted.

Hereinafter, the operation and effect of an injection foam molding apparatus for manufacturing a one-piece shoe having various colors, hardnesses and specific gravities using thermoplastic resins according to an embodiment of the present invention will be described with reference to FIG. 16.

First, as shown in FIGS. 1 and 16, in a state in which a middle mold 300 is inserted between the top mold 100 and the bottom mold 200, the interior of each mold is then washed to remove impurities therefrom. Subsequently, a mold-release agent is applied thereon, and then an injection foam molding apparatus is operated. When the injection foam molding apparatus is operated, the middle mold 300 located at the rear is moved forward by the transfer unit 500 and is thus inserted into the space between the top mold 100 and the bottom mold 200. In this state, the top mold 100 and the bottom mold 200 are moved toward the middle mold 300 by the pressing unit 600. At this time, the moving core 110 in the top mold 100, which is protruded downward by a spring 140, moves upward while compressing the spring 140 as the top mold 100 moves downward.

As shown in FIGS. 5 and 16, after the three molds are completely coupled with one another (mold closing state), the moving core which is not shown in FIG. 5 and is denoted by reference numeral 110 in FIG. 2 in the top mold 100 is held. In an embodiment of the present invention, in the state in which the operation of the injection foam molding apparatus is stopped, a bolt 160 provided on one side of the top mold 100 as shown in FIG. 2 is rotated or a cylinder is operated, thus preventing the moving core 110 from moving upward or downward. The reason for holding the moving core 110 is to allow a material injected in the injection process to be seated in the top mold 100 and to prevent the upper part of a shoe, that is, the upper and the upper part of the bottom of the shoe molded in the molding space of the top mold 100 from being separated from the top mold 100 when the top mold 100 is lifted up in order to separate the middle mold 300.

Subsequently, as shown in FIGS. 5 and 16, nozzles 410 provided in a resin supply unit 400 are coupled with resin injection holes 170 and 210 formed in the top mold 100 and bottom mold 200, respectively. Thermoplastic resin is injected through the nozzles 410 of the resin supply unit 400 and resin injection holes 170 and 210 of the molds 100 and 200 into a molding space defined between the top mold 100 and the middle mold 300 and a molding space defined between the bottom mold 200 and the middle mold 300, in a state in which the molds are closed. Here, a soft thermoplastic resin is injected into the top mold 100, and a thermoplastic resin having high durability is injected into the bottom mold 200, and then the injected thermoplastic resins are foamed in the respective molding spaces. In this case, since the resin supply unit 400 is installed to be moved forward and backward by an actuator (not shown), the resin supply unit 400 is coupled with the mold assembly so that thermoplastic resins are injected into the mold assembly only when the thermoplastic resins are injected thereto (see FIGS. 5 and 16), and the resin supply unit 400 is separated from the mold assembly and is spaced apart therefrom, as shown in FIG. 1, after the thermoplastic resins are injected thereto. The reason for this is to prevent the middle mold 300 from colliding with the resin supply unit 400 when the middle mold 300 is removed in subsequent processes.

When the thermoplastic resins injected into the mold assembly are foamed and then become hard to some degree, the top mold 100 and bottom mold 200 are moved upward and downward, respectively, by the pressing unit 600. Therefore, when the top mold 100 and bottom mold 200 are separated from the middle mold 300, as shown in FIGS. 3 and 4, the transfer unit 500 supports and moves the protrusions 310 of the middle mold 300 while being in contact with the lower surfaces of the protrusions 310 formed on a side surface of the middle mold 300, thus separating the middle mold 300.

In this case, in order to prevent the thermoplastic resins from adhering to the middle mold 300, the surface of the middle mold 300 is gloss-plated or is coated with Teflon.

When the middle mold 300 is completely detached from the mold assembly, as shown in FIGS. 7 and 16, the pressing unit 600 is operated again, so that the top mold 100 and the bottom mold 200 are coupled with each other, with the result that the upper part and lower part of a shoe in the mold assembly are integrated with each other, thereby forming a one-piece shoe. That is, when the top mold 100 is moved downward by the pressing unit 600 and simultaneously the bottom mold 200 is moved upward, so that the top mold 100 and the bottom mold 200 are coupled with each other into the mold closing state, the upper part of the shoe molded in the top mold 100 through an injection foam process and the lower part of the shoe molded in the bottom mold 200 through an injection foam process are compressed against and coupled with each other. As a result, the upper and lower parts are integrated with each other, thus providing a single one-piece shoe.

When the forming of the one-piece shoe is completed, the bolt 160 provided on a side surface of the top mold 100 is loosened, and thus the moving core 110 freely moves upward and downward.

Thereafter, when the top mold 100 and bottom mold 200 are separated from each other, the moving core 110, provided in the top mold 100, protrudes downward. At this time, since the formed one-piece shoe is hung on the moving core 110, a worker separates the one-piece shoe from the moving core 110, and then inserts a foot-shaped mold into the one-piece shoe, thus preventing the one-piece shoe from being deformed.

Hereinafter, a method of manufacturing a one-piece shoe using the injection foam molding apparatus according to an embodiment of the present invention will be described. First, an ethylene-vinyl acetate (EVA) material is prepared by reforming an ethylene-vinyl acetate copolymer having a vinyl acetate content of 9~33 wt % and a melt flow index of 1.5~40 g/10 min, an ethylene-octene copolymer having an octene content of 9~50 wt % and a melt flow index of 0.5~70 g/10 min, and an ethylene-butene copolymer having an butene content of 9~50 wt % and a melt flow index of 0.5~70 g/10 min.

Here, the reforming process is performed using the following methods. First, there is a method of hydrolyzing an ethylene-vinyl acetate copolymer, an ethylene-octene copolymer, and an ethylene-butene copolymer.

Second, there is a method of adding 0.05~5 parts by weight of alcohol and 0.05~5 parts by weight of unsaturated carboxylic acid to 100 parts by weight of an ethylene-vinyl acetate copolymer and then graft-copolymerizing the mixture. In the method, as the alcohol, vinyl alcohol is used, and, as the unsaturated carboxylic acid, acrylic acid or methacrylic acid is used.

Third, there is a method of graft-copolymerizing 0.1~10 parts by weight of an acid anhydride or a silane compound with 100 parts by weight of an ethylene-vinyl acetate copolymer. In the method, the acid anhydride may be any one selected from among acetic acid anhydride, phthalic acid anhydride, succinic acid anhydride and glutaric acid anhydride. The silane compound may be selected from among vinyl-based silanes, such as vinyl-trichlorosilane, vinyl-tris (2-methoxyethoxy)silane, vinyl-triethoxysilane and vinyl-trimethoxy silane; 2-(3-,4-epoxycyclohexyl) ethyltrimethoxysilane; 3-glycidyloxypropyltrimethoxysilane; and 3-glycidyloxypropylmethyldiethoxy silane.

In addition to the above methods, there is a method of graft-copolymerizing 0.5~30 parts by weight of a monomer and any one of ethylene-octene, ethylene-butene and a polymer with 100 parts by weight of an ethylene-vinyl acetate copolymer. In the method, the monomer may be any one selected from among styrene, acrylamide, acrylonitrile, vinyl acetate, methyl acrylate, methyl methacrylate, ethyl methacrylate, 2-hydroxyethyl methacrylate, butadiene, isoprene, and isobutylene. The polymer may be any one selected from among polypropylene, polyisobutylene, polymethacrylate, and poly$\alpha$-methylstyrene.

Subsequently, the EVA material is combined with a cross-linking agent, a foaming agent and other additives to form a liquid EVA compound. The description of the kind and ratio of the cross-linking agent, foaming agent and other additives will be omitted because the kind and ratio thereof are well known to those skilled in the art. Here, olefin resins, Engage, Tafmer or combinations thereof may be used instead of the EVA.

Subsequently, in a state in which the top mold 100, the middle mold 200, and the bottom mold 300 are coupled with each other to be closed, the EVA compound is injected through the resin supply unit 400 into the molding spaces defined by the molds, and is then cross-linked for 2~20 minutes under conditions such that the internal temperature of a screw for supplying resin is 40~150° C., and the temperature of the mold assembly is 120~200° C.

Subsequently, the EVA compound, injected into the top mold 100 and bottom mold 200, is foamed by instantly opening the top mold and bottom mold 100 and 200. Then, the upper and lower parts of a shoe are integrated with each other by separating a middle mold 300 from the mold assembly and then closing the top mold and bottom mold again, and thereafter the top mold 100 and the bottom mold 200 are separated from each other to be open, thus obtaining a one-piece shoe.

That is, the upper and lower parts of a shoe are formed using different materials by one injection foam molding apparatus, and are then coupled with each other, so that an upper, a midsole and an outsole, constituting a shoe, are formed in one piece, with the result that work is conveniently conducted. Further, the upper part and lower part of a shoe have different colors, hardnesses and specific gravities from each other, so that, as shown in FIGS. 8 to 10, shoes that feel good and are attractive can be obtained.

An apparatus for manufacturing a one-piece shoe is described in an embodiment of the present invention, but the scope of the present invention is not limited thereto. If the interior shapes of the top mold and bottom mold are modified, a sole, the upper and lower parts of which have different colors from each other, as shown in FIG. 11, and a sandal, the upper and lower parts of which have different colors from each other, as shown in FIG. 12, can be manufactured.

Hereinafter, a one-piece shoe according to an embodiment of the present invention will be described in detail with reference to the attached drawings.

In the one-piece shoe 700 having various colors, hardnesses and specific gravities using thermoplastic resins, manufactured using the injection foam molding apparatus, the upper part and lower part thereof are made of different materials from each other. The thermoplastic resin that is injected and foamed has a hardness of about 70 C~20 C, as measured using an Asker-C type hardness tester, which is an international hardness tester, and a specific gravity of 0.30 g/cm$^3$~0.10 g/cm$^3$.

Since the one-piece shoe 700 has poor air permeability, a plurality of air holes 710 is formed in its upper and bottom. Specifically, in the one-piece shoe 700 of the present invention, some of the air holes 710 are formed along the lower side of an upper, as shown in FIG. 8, and air passages 810 are concavely formed in the bottom side of an insole 800 inserted into the one-piece shoe 700, as shown in FIG. 9. Here, the ends of the air passage 810 are adjacent to the air holes 710 formed in the lower portion of the upper, and thus the ambient air flowing into the one-piece shoe through the air holes 710 flows into the one-piece shoe along the air passage 810.

Further, as shown in FIG. 10, air holes 750 formed in the bottom of the one-piece shoe 700 correspond to through-holes 840 formed in an insole 800, and thus the bottom and interior portion of the one-piece shoe 700 are also connected to each other.

Meanwhile, in the one-piece shoe 700 of the present invention, impact absorbing members 820 are formed beneath the insole 800. The impact absorbing members 820 is made of a material which may absorb impact, thus serving to absorb the impact applied to a shoe at the time of walking such that the impact is not transmitted to the foot of the walker. In the present invention, in order to minimize the requirement of the impact absorbing members 820, as shown in FIG. 9, the impact absorbing members 820 are formed along an impact curve, along which an impact is applied to the foot of a walker at the time of walking.

In this case, since the impact absorbing members 820 formed beneath the insole 800 protrude, it is required to form recesses (not shown) corresponding to the impact absorbing members 820 in the inner bottom of the shoe. That is, the impact absorbing members 820 of the insole 800 may be received in the recesses. The recesses are formed by protruding the lower surface of the moving core 110 of the top mold 100 in the injection foam molding process.

Accordingly, since the impact absorbing members 820 are fitted into the recesses, the insole 800 is securely fixed. Further, since the impact absorbing members 820 absorb the impact applied to a foot, walking is easy, and injury can be prevented.

Here, instead of providing the insole 800 with the impact absorbing members 820, concave recesses are formed in the lower surface of a shoe, and then the impact absorbing members 820 may be inserted into the concave recesses. Even in this case, the impact absorbing members 820 are formed along the impact curve shown in FIG. 9.

Further, in order to enable the shoe 700 to be easily put on, an opening 720 is formed at a position between the top and lateral side of a foot. The opening 720 is formed at one side of the shoe 700 or both sides thereof, and enables a foot to be easily inserted into the opening 720 because the opening becomes wider due to the insertion of the foot when a walker puts on the shoe. However, in order to prevent the shoe from coming off after the shoe is put on, a strip-shaped coupling member 730 such as padding or a shoelace for fastening a shoe is provided at the end of the top of a foot, and the coupling member is provided at the end thereof with fastening means 740, such as Velcro tape, a snap button, rubber, or the like, so that the fastening means is fastened to the side of a shoe. The coupling member 730 and the fastening means 740 enable a wearer's foot to be secured, thus preventing a shoe from coming off and providing a fashionable effect.

The shoe 700 manufactured in this way is easily ventilated because it has air holes 710 and air passages 810 adjacent to the air holes 710, and has a very superior feeling when worn because it has impact absorbing members 820. Further, since the lower part of the shoe 700 is made of a material having high durability and the upper part thereof is made of a material having good feeling, high-quality shoes can be manufactured.

In an embodiment of the present invention, the one-piece shoe is manufactured only by injection-molding thermoplastic resins in a mold assembly, but may be manufactured by inserting a preformed part into the mold assembly and then supplying thermoplastic resins thereto, thus improving the durability of the one-piece shoe.

For example, as shown in FIG. 13, the impact absorbing members 760 which are to be coupled to the bottom of the lower part of the one-piece shoe are previously formed and then are inserted into the bottom mold 200. Subsequently, after the top mold 100, the middle mold 300 and the bottom mold 200 are coupled to each other, thermoplastic resins are introduced thereinto, thus integrating the impact absorbing members 760 with the lower part of the shoe. Thereafter, as described above, after the middle mold 300 is separated from the mold assembly, the top mold 100 and the bottom mold 200 are coupled to each other, thus allowing the lower part of the shoe having the impact absorbing members 760 to be coupled to the upper part of the shoe.

Meanwhile, FIG. 14 is a bottom view illustrating the top mold in the injection foam molding apparatus for manufacturing the one-piece shoe of FIG. 1. It is a detailed view illustrating the space 101 which is engraved on the top mold 100 in intaglio in a state in which the moving core 110 is removed.

Further, FIG. 15 is a plan view illustrating the bottom mold in the injection foam molding apparatus for manufacturing the one-piece shoe of FIG. 1. It is a detailed view illustrating the space 201 which is engraved on the bottom mold 200 in intaglio.

FIG. 16 is a view sequentially illustrating the processes of manufacturing a one-piece shoe using the injection foam molding apparatus for manufacturing the one-piece shoe according to the present invention, in which each of the processes has been described hereinbefore.

The invention claimed is:

1. An injection foam molding apparatus for manufacturing a one-piece shoe or sole having various colors, hardnesses and specific gravities, using ethylene-vinyl acetate (EVA) ethylene-poly olefin compounds and thermoplastic resins, the apparatus comprising:
a top mold including a molding space having a shape corresponding to an upper part of a shoe or sole;
a bottom mold including a molding space having a shape corresponding to a lower part of the shoe or sole;
a middle mold configured to be located between the top mold and the bottom mold and to separate the two molding spaces of the top mold and bottom mold from each other;
a resin supply unit configured to supply different thermoplastic resins into the molding space defined between the top mold and the middle mold and the molding space defined between the middle mold and the bottom mold, respectively;
a transfer unit configured to
move the middle mold into a space between the top mold and the bottom mold, and
remove the middle mold from the space between the top mold and the bottom mold; and
a pressing unit configured to press the thermoplastic resins charged in the molding spaces by moving the top mold downward and bottom mold upward,
wherein
the resin supply unit is configured to inject the thermoplastic resins into the molding spaces of the top mold and bottom mold in a state in which the top mold and bottom mold are coupled with the middle mold, and then
the pressing unit is configured to press the top mold and the bottom mold against the middle mold to form the upper part and lower part of the shoe or sole, and then the transfer unit is configured to separate the middle mold from the top mold and bottom mold, and then the pressing unit is configured to press the top mold and bottom mold, including the formed upper part and lower part of the shoe or sole, to each other, thereby forming the upper part and lower part of the shoe or sole into one body,
wherein the top mold comprises a moving core for forming an inner shape of the shoe,
wherein the moving core is moveable upward and downward in the molding space of the top mold, and the moving core is coupled with a spring for biasing the moving core downward,
wherein the transfer unit is further configured to
be contacted with protrusions which are provided on a side surface of the middle mold, and
move the middle mold forward, backward, upward and downward while the middle mold is supported by the protrusions,
wherein the moving core comprises a rod-shaped moving member which is integrally provided on an upper portion of the moving core and is coupled to the spring, and the moving member is inserted into a through-hole formed in an upper portion of the top mold,
wherein the moving member is configured to move upward and downward along the through-hole in the top mold, and the moving core is configured to move upward and downward integrally with the moving member.

2. The injection foam molding apparatus according to claim 1, wherein
an upper spring support end is integrally provided on an upper end of the moving member, and a lower spring support end is provided below the upper spring support end to be stopped by an upper surface of the top mold while being fitted over the moving member in such a way as to permit upward and downward movement of the moving member, and
the spring is mounted on the moving member in such a way as to be positioned between the upper spring support end and the lower spring support end.

3. The injection foam molding apparatus according to claim 1, wherein the top mold is provided at one side thereof with a holding unit for preventing the moving core from being displaced upward and downward.

4. The injection foam molding apparatus according to claim 1, wherein the thermoplastic resin is one or more selected from among olefin resins, ethylene-vinyl acetate (EVA), ethylene-octene copolymer, ethylene-butene copolymer, Engage, Tafmer, and combinations thereof.

5. The injection foam molding apparatus according to claim 1, wherein the thermoplastic resin that is injected and foamed has a hardness of about 70C~20C, which is measured using a Asker-C type hardness tester, which is an international hardness tester, and a specific gravity of 0.30 $g/cm^3$~0.10 $g/cm^3$.

6. The injection foam molding apparatus according to claim 1, wherein the thermoplastic resin is cross-linked for 2~20 minutes on condition that a temperature of a screw of the resin supply unit for supplying the resin is 40~150° C., and a temperature of the molds is 120~200° C.

7. The injection foam molding apparatus according to claim 1, wherein
the top mold is engraved in intaglio to have a shape corresponding to that of an upper part of the one-piece shoe and an upper part of the sole, and
a space of the top mold engraved in intaglio forms the molding space in the top mold and is configured to be sealed by the middle mold.

8. The injection foam molding apparatus according to claim 7, wherein an upper surface of the middle mold, which is configured to be coupled to the top mold, has a shape corresponding to that of a lower surface of the upper part of the one-piece shoe.

9. The injection foam molding apparatus according to claim 1, wherein
the bottom mold is engraved in intaglio to have a shape corresponding to that of a lower part of the one-piece shoe, and
a space of the bottom mold engraved in intaglio forms the molding space in the bottom mold and is configured to be sealed by the middle mold.

10. The injection foam molding apparatus according to claim 9, wherein a lower surface of the middle mold, which is configured to be coupled to the bottom mold, has a shape corresponding to that of an upper surface of the lower part of the one-piece shoe.

11. The injection foam molding apparatus according to claim 1, wherein the transfer unit comprises a rail, so that the middle mold is placed on the rail to be moved along the rail.

* * * * *